(12) United States Patent
Stave et al.

(10) Patent No.: US 12,067,502 B1
(45) Date of Patent: *Aug. 20, 2024

(54) SYSTEMS AND METHODS FOR USING MACHINE LEARNING FOR MANAGING APPLICATION INCIDENTS

(71) Applicant: Wells Fargo Bank, N.A., San Francisco, CA (US)

(72) Inventors: Jennifer Ann Stave, Minneapolis, MN (US); Jiaju Liu, Phoenix, AZ (US); Saara Raja, Waxhaw, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,962

(22) Filed: Jan. 16, 2023

Related U.S. Application Data

(63) Continuation of application No. 16/824,175, filed on Mar. 19, 2020, now Pat. No. 11,556,815.

(51) Int. Cl.
*G06N 5/04* (2023.01)
*G06F 16/2455* (2019.01)
*G06N 20/00* (2019.01)

(52) U.S. Cl.
CPC ........... *G06N 5/04* (2013.01); *G06F 16/2456* (2019.01); *G06N 20/00* (2019.01)

(58) Field of Classification Search
CPC ....... G06F 16/2456; G06N 20/00; G06N 5/04
See application file for complete search history.

(56) References Cited

U.S. PATENT DOCUMENTS

| | | |
|---|---|---|
| 8,903,983 B2 | 12/2014 | Bakman et al. |
| 9,460,401 B2 | 10/2016 | Zeng et al. |
| 9,542,176 B2 | 1/2017 | Bird et al. |

(Continued)

FOREIGN PATENT DOCUMENTS

CN 105893256 A 8/2016

OTHER PUBLICATIONS

"U.S. Appl. No. 16/824,175, Examiner Interview Summary mailed Aug. 29, 2022".

(Continued)

*Primary Examiner* — Dangelino N Gortayo
(74) *Attorney, Agent, or Firm* — SCHWEGMAN LUNDBERG & WOESSNER, P.A.

(57) ABSTRACT

Disclosed herein are systems and methods for using machine learning for managing application incidents. An embodiment takes the form of a method that includes receiving extracted data pertaining to one or more applications. Model-input data is generated from the extracted data. Model-output data is generated at least in part by processing the generated model-input data with one or more machine-learning models trained to make one or more application-incident predictions. Based at least in part on the model-output data, an application-incident-likely determination is made that a likelihood of an occurrence of an application incident exceeds an application-incident-likelihood threshold, where the application incident corresponds to a given application of the one or more applications. Responsive to making the application-incident-likely determination, one or more alerts of the likelihood of the occurrence of the application incident are output.

20 Claims, 7 Drawing Sheets

(56) References Cited

U.S. PATENT DOCUMENTS

| | | | |
|---|---|---|---|
| 9,720,815 | B2 | 8/2017 | Champlin-scharff et al. |
| 9,799,007 | B2 | 10/2017 | Blincoe et al. |
| 11,245,726 | B1 | 2/2022 | Kats et al. |
| 11,814,062 | B2 * | 11/2023 | Sharifi ................... G06N 3/045 |
| 2016/0246659 | A1 | 8/2016 | Komatsu et al. |
| 2016/0300148 | A1 | 10/2016 | Kelly |
| 2017/0262360 | A1 | 9/2017 | Kochura et al. |
| 2019/0019109 | A1 | 1/2019 | Sadaghiani et al. |
| 2019/0028492 | A1 | 1/2019 | Coleman et al. |
| 2019/0034932 | A1 * | 1/2019 | Sadaghiani ............ G06N 20/00 |
| 2019/0073258 | A1 | 3/2019 | Young et al. |
| 2019/0149565 | A1 | 5/2019 | Hagi et al. |
| 2019/0372867 | A1 * | 12/2019 | Palamari ............. G06F 9/45558 |
| 2020/0184355 | A1 * | 6/2020 | Mehta ................. G06F 11/3476 |
| 2020/0202184 | A1 * | 6/2020 | Shrestha ............ G06F 16/9024 |
| 2021/0021595 | A1 | 1/2021 | File et al. |
| 2021/0157562 | A1 | 5/2021 | Sethi et al. |
| 2021/0263733 | A1 | 8/2021 | Tanniru et al. |

OTHER PUBLICATIONS

"U.S. Appl. No. 16/824,175, Non Final Office Action mailed Jun. 3, 2022".

"U.S. Appl. No. 16/824,175, Notice of Allowance mailed Sep. 29, 2022".

"U.S. Appl. No. 16/824,175, Response filed Sep. 6, 2022 to Non Final Office Action mailed Jun. 3, 2022", 10 pgs.

Challagulla, Venkata, et al., "Empirical Assessment Of Machine Learning Based Software Defect Prediction Techniques", Proceedings of the 10th IEEE International Workshop on Object-Oriented Real-Time Dependable Systems, (Feb. 2, 2005), 8 pgs.

Kiran, N, et al., "Software reliability prediction by soft computing techniques", The Journal of Systems and Software, (2007), 8 pgs.

* cited by examiner

SYSTEMS AND METHODS FOR USING MACHINE LEARNING FOR MANAGING APPLICATION INCIDENTS

CROSS-REFERENCE TO RELATED APPLICATION

This application is a continuation of U.S. patent application Ser. No. 16/824,175, filed Mar. 19, 2020, now issued as U.S. Pat. No. 11,556,815, which is incorporated by reference herein in its entirety.

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and/or the like. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and/or the like. There are many organizations, such as large, complex, multinational corporations (including financial-services institutions), that operate and manage large, complex information technology (IT) ecosystems for both internal operations and for customer-facing activities, among other purposes. These ecosystems typically contain many different interoperating systems, servers, applications, interfaces, and the like. It is important to such organizations and their customers that these ecosystems operate reliably and effectively.

OVERVIEW

In an example scenario, within an IT ecosystem, a financial-services institution operates numerous applications. In at least one embodiment, each such application is a program that executes on hardware to perform one or more specific functions for one or more users and/or one or more other IT assets. Such users could be internal to (e.g., employees of) the financial-services institution, customers of the financial-services institution, and/or the like.

One example of an application that the financial-services institution may operate in their respective IT ecosystem is a web-based portal (including, e.g., a web-server application) for customers to use in accessing and managing their financial information, accounts, and the like. Another example of an application that the financial-services institution may operate is a mobile application that customers can download and install on their respective mobile devices in order to conduct many of the same functions that may be available via the aforementioned web-based portal. Another application operated by the financial-services institution could be an operating system for ATMs, as well as numerous other applications that may provide and/or support various features and functions available to customers via ATMs. Yet another application could be a statistical-analysis application such as the statistical analytic software (SAS) developed by SAS Institute of Cary, North Carolina. Other examples include human-resources applications, accounting applications, bill-pay applications, billing applications, loan-servicing applications, call-center applications, and/or the like. Numerous additional example applications could be listed here as well.

In the context of such an IT ecosystem of a complex organization, incidents (e.g., problems, errors, faults, malfunctions, and/or the like) sometimes happen in connection with one or more of the multiple applications that operate in the ecosystem. Some example types of application incidents include patching-related incidents (e.g., incidents related to one or more software patches having not been properly deployed, one or more software patches not having been properly constructed, and/or the like), access-related incidents (e.g., problems with one or more user-access configurations), configuration-related incidents, server-relationship-related incidents, and/or the like. Other types of application incidents can occur as well.

Moreover, in many IT ecosystems, various different types of data pertaining to various different applications is housed in multiple different data stores (e.g., data silos), some examples of which are described in this disclosure. As a few examples, for a given application, separate data stores may be maintained for types of application data such as cache data, controls data, vulnerability data, and risk data, among numerous other example types of data that could be listed here. This sort of fragmented environment presents challenges that are among the challenges that are addressed by embodiments of the present disclosure.

Indeed, among other inspirations and motivations, the present systems and methods arise in part from the realization and recognition of the importance and value of preventing application incidents from occurring. When such incidents do occur, they have negative impacts such as customer impacts (e.g., customers being inconvenienced, frustrated, and even worried by not being able to access web portals, ATMs, and/or the like), business impacts (e.g., one or more internal functions may not be available when one or more software tools (e.g., SAS) are rendered at least temporarily unavailable), and/or the like. In particular with respect to customer impacts, outages in capabilities such as online banking, mobile banking, ATM networks, card processing, online bill pay, payment-network processing, call centers, and/or the like can have significant negative effects both on the bottom line and the reputation of a financial-services institution. Moreover, financial-services institutions can face regulatory restraints on growth and other initiatives until such time as one or more government entities are satisfied that certain issues related to, e.g., risk management, governance, and/or the like have been addressed. And certainly the negative impacts of application incidents are not limited to financial-services institutions, as such institutions are offered by way of example and not limitation.

To address the above-described issues as well as others, disclosed herein are systems and methods for using machine learning for managing application incidents. In conventional approaches, subsequent to the occurrence of an incident in connection with a given application, a myopic analysis is conducted in which only data that is related to that particular application is assessed. Unlike those conventional approaches, embodiments of the present disclosure take an ecosystem-wide view that encompasses multiple interoperating applications and systems, and leverages the power of machine learning to predict and prevent the occurrence of application incidents. Thus, among other benefits, embodiments of the present disclosure produce potentially significant cost savings by harnessing machine learning for preventative IT maintenance—i.e., preventing the incurring of application-incident-related costs and other negative impacts by preventing application incidents from occurring in the first place. Moreover, while the present disclosure primarily describes embodiments that relate to the prediction and prevention of application incidents, the embodiments that are described herein can be applied to the detection of—and recovery from—application incidents as well.

One example embodiment takes the form of a method that includes receiving extracted data pertaining to one or more applications, and generating model-input data from the extracted data. The method also includes generating model-output data at least in part by processing the generated model-input data with one or more machine-learning models, where the one or more machine-learning models have been trained to make one or more application-incident predictions. The method also includes making, based at least in part on the model-output data, an application-incident-likely determination that a likelihood of an occurrence of an application incident exceeds an application-incident-likelihood threshold, where the application incident corresponds to a given application of the one or more applications. The method also includes, responsive to making the application-incident-likely determination, outputting one or more alerts of the likelihood of the occurrence of the application incident.

Another embodiment takes the form of a system that includes at least one processor, and that also includes one or more non-transitory computer readable storage media containing instructions executable by the at least one processor for causing the at least one processor to perform at least the operations that are listed in the preceding paragraph. Still another embodiment takes the form of one or more non-transitory computer readable storage media (CRM) containing instructions executable by the at least one processor for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
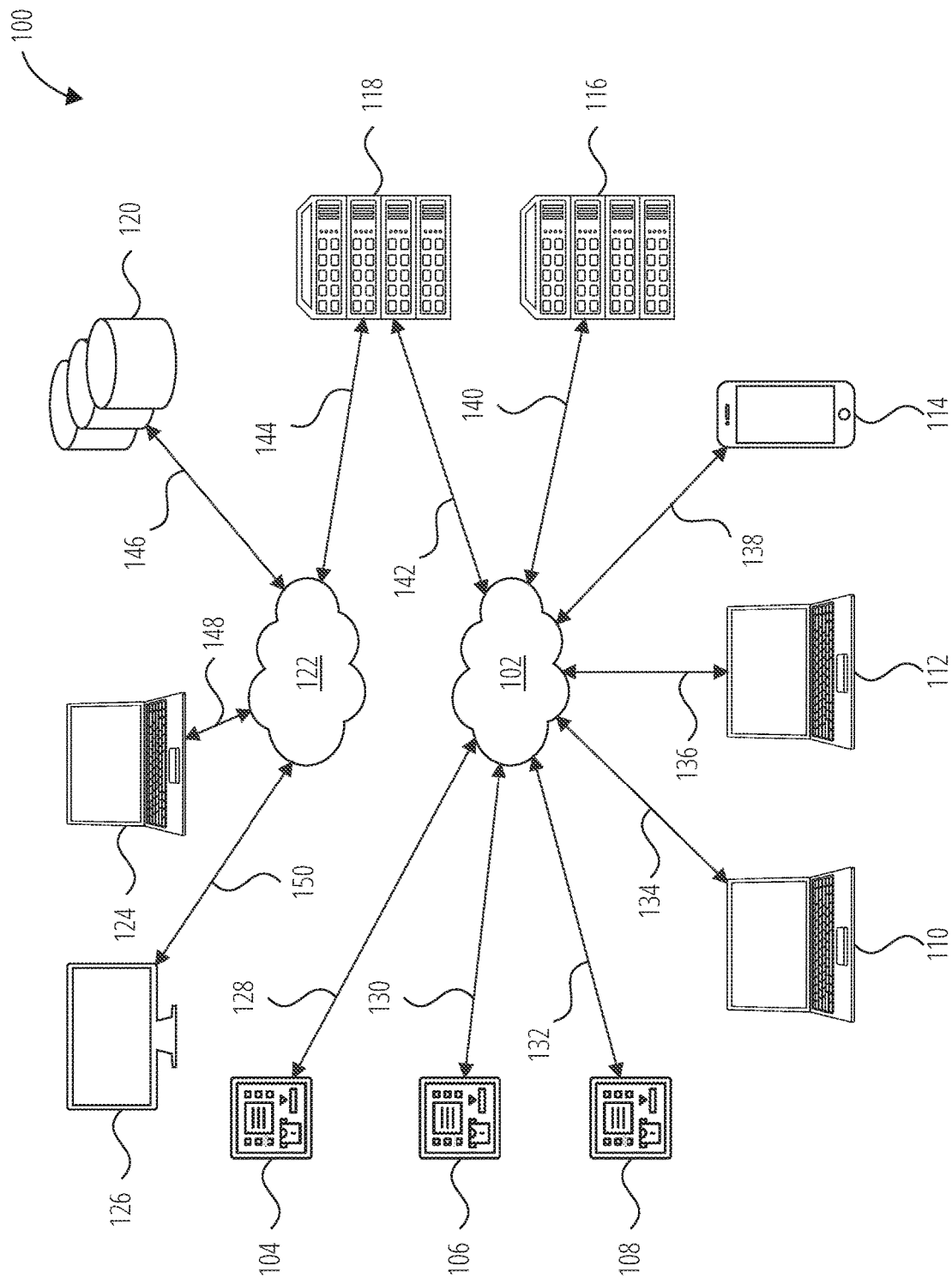
FIG. 1 illustrates an example communication context, in accordance with at least one embodiment.

FIG. 1 illustrates an example communication context 100 in which at least one embodiment of the present disclosure can be carried out. The communication context 100 is provided purely by way of example and not limitation, as embodiments of the present disclosure can be carried out in numerous different types of communication contexts having different numbers, types, and/or arrangements of devices, networks, and/or the like.

In the example communication context 100 that is depicted in FIG. 1, a number of different entities are communicatively connected with a network 102 via respective communication links. These include an ATM 104 via a communication link 128, an ATM 106 via a communication link 130, an ATM 108 via a communication link 132, a laptop computer 110 via a communication link 134, a laptop computer 112 via a communication link 136, a mobile device 114 via a communication link 138, a server system 116 via a communication link 140, and a server system 118 via a communication link 142. In the depicted example, the server system 118 is also communicatively connected via a communication link 144 with a network 122. Also connected with the network 122 are a data-store system 120 via a communication link 146, a laptop computer 124 via a communication link 148, and a desktop computer 126 via a communication link 150.

In an example scenario, the network 102 could be a data-communication network such as, including, or in communication with the Internet. The network 102 could operate according to a suite of communication protocols such the Transmission Control Protocol (TCP) over the Internet Protocol (IP) (collectively, TCP/IP), the User Datagram Protocol (UDP) over IP (UDP/IP), and/or others. Furthermore, the network 122 could be a private IP network operated by an institution such as a financial-services institution as an example. In addition to other functions, the server system 118 could provide network-access-server (NAS) functions, gateway services, firewall protections, and/or the like between the network 102 and the network 122. Any of the devices in communication with the network 102, such as one or more of the ATM 104, the ATM 106, and the ATM 108, the laptop computer 110, and/or the server system 116, as examples, could communicate via the network 102 and the server system 118 with one or more entities on the network 122, in some cases doing so via a virtual private network (VPN) and/or another type of secure-tunneling communication protocol, connection, and/or the like.

Any one or more of the ATM 104, the ATM 106, and the ATM 108 could be an ATM that provides conventional ATM-type services such as cash withdrawal, check deposit, account transfers, balance inquiries, bill pay, and/or the like. Users may access any one or more of the ATM 104, the ATM 106, and the ATM 108 using a secure card, a mobile device such as the mobile device 114, and/or the like, along with provided security credentials such as a personal identification number (PIN), password, passcode, and/or the like. In some implementations, biometric authentication is used by one or more of the ATM 104, the ATM 106, and the ATM 108.

Any one or more of the communication links depicted in FIG. 1 or in any of the other figures could be or include one or more wired-communication links (e.g., Ethernet, fiber optic, Universal Serial Bus (USB), and/or the like) and/or one or more wireless-communication links (e.g., Wi-Fi, LTE, Bluetooth, Bluetooth Low Energy, and/or the like). Moreover, any one or more of the communication links could include one or more intermediate devices such as one or more routers, bridges, servers, access points, base stations, and/or the like. Additionally, any communication link could include one or more VPN and/or other tunneling-type connections.

Any one or more of the ATM 104, the ATM 106, the ATM 108, the laptop computer 110, the laptop computer 112, the mobile device 114, the server system 116, the server system 118, the data-store system 120, the laptop computer 124, the desktop computer 126, and any of the entities that are depicted in the other figures could have an architecture similar to that described below in connection with the example machine 600 of FIG. 6 and could execute software having a structure similar to that described below in connection with the example software architecture 702 of FIG. 7. Moreover, any one or more of these entities could host all or part of any of the applications described by way of example herein or any other applications deemed suitable by those of skill in the art for a given implementation or in a given context. As but one example, the server system 116 could host a web-server application that provides an online-banking web-portal application that can be accessed by entities such as the laptop computer 110, the laptop computer 112, the mobile device 114, and/or the like. As another example, a mobile-banking application could be downloaded to, installed on, and executed by mobile devices such as the mobile device 114. As another example, the server system 118 could host SAS or another statistical-analysis application that could be securely accessed from terminals such as the laptop computer 124 and/or the desktop computer 126. The instance of SAS hosted by the server system 118 could be an enterprise version, as an example. Instead of or in addition to the server system 118 hosting an enterprise version of SAS or another similar application, one or both of the laptop computer 124 and the desktop computer 126 could host local copies of a desktop version of SAS or another similar application. And numerous other examples could be listed here as well.

Moreover, although pictured as data-storage containers, the data-store system 120 could include, in addition to one or more data-storage devices, units, and/or the like, one or more database servers that operate to serve valid requests to carry out database operations with respect to the data-store system 120, where such database operations could include operations to store data, retrieve data, extract data, modify data, update data, remove data, and/or the like. Moreover, although the data-store system 120 is shown as being in a single network location in the communication context 100, the data-store system 120 could include multiple different data silos in multiple different geographic and/or network-topology locations. Some example data silos that could be included in the data-store system 120 are depicted in and described below in connection with FIG. 2.

Figure 2:
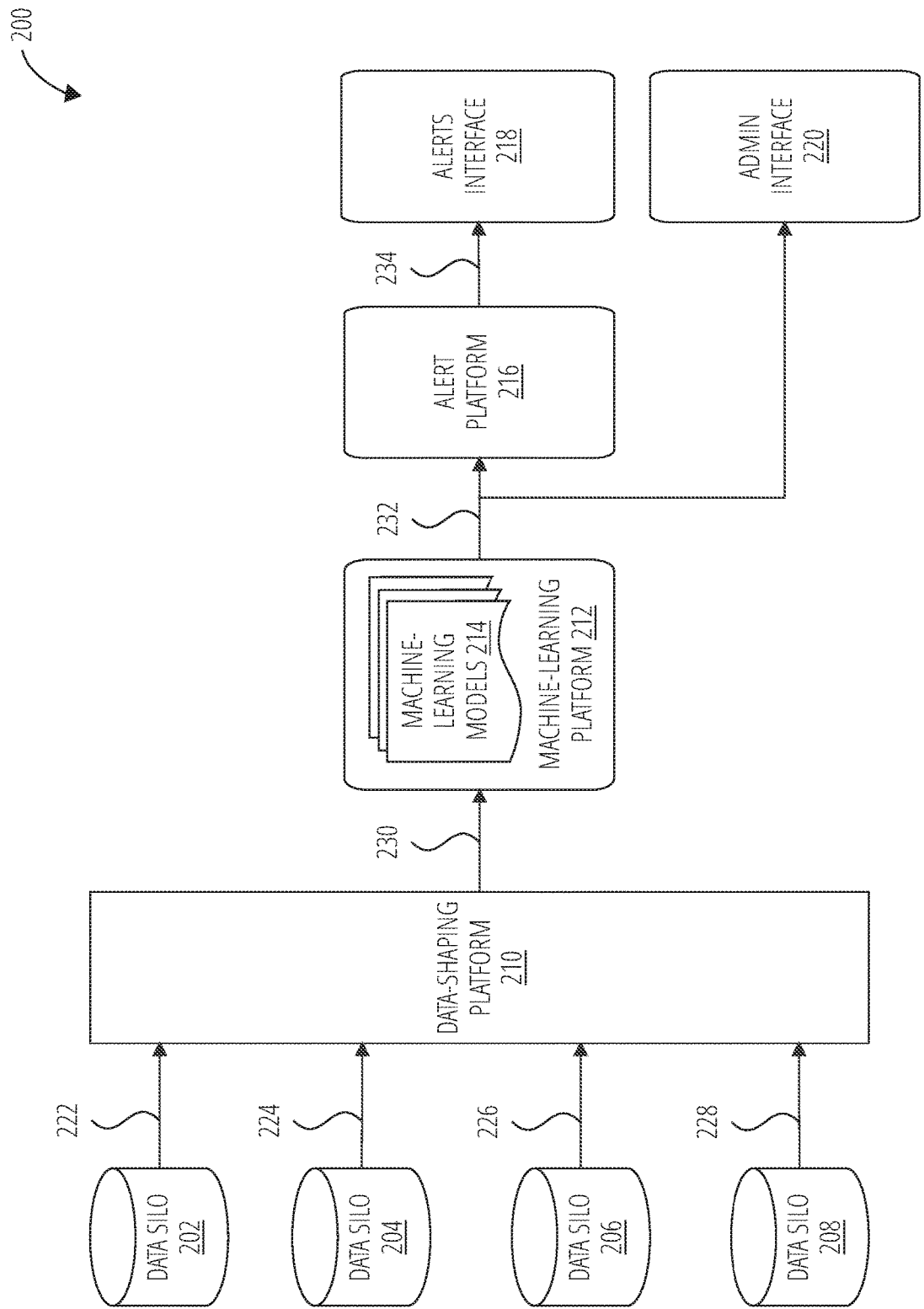
FIG. 2 illustrates an example application-incident-management system, in accordance with at least one embodiment.

FIG. 2 illustrates an example application-incident-management system 200. As shown in FIG. 2, the application-incident-management system 200 includes four example data silos (a data silo 202, a data silo 204, a data silo 206, a data silo 208), a data-shaping platform 210, a machine-learning platform 212, an alert platform 216, an alerts interface 218, and an admin interface 220. In some embodiments, each of these entities is a separate device or system that is physically distinct from each of the other entities that are shown by way of example in FIG. 2. In other embodiments, one or more of these entities are combined into a single device or system that performs the functions of each such combined entity. Any one or any combination of these entities could have an architecture similar to the example machine 600 of FIG. 6 and could have a software architecture similar to the example software architecture 702 of FIG. 7. As a general matter, the application-incident-management system 200 could be part of an IT ecosystem operated by an institution such as a financial-services institution.

Each of the data silo 202, the data silo 204, the data silo 206, and the data silo 208 could house one or more particular types of data pertaining to one or more of the applications operating within an IT ecosystem of an institution. Some example types of data silos are given below, where the provided label for each listed example type of data silo refers to the example type of data stored therein.

One of the data silos could be a change-management data silo that houses data related to a clearinghouse function for changes to applications within the ecosystem. A change-management data silo could include data pertaining to (e.g., generated by, used by, and/or the like) an application or set of applications, such as a suite of change-management tools. Generally stated, with respect to this example and other examples that are given herein of specific software products, these software products are offered purely by way of illustration and not limitation. Other examples of similar software products could be used in various different implementations, and certainly other types of software products (e.g., applications) could be present in various different example implementations as well.

Another example is a risk-management data silo, which could house data related to a clearinghouse for issues at a given financial-services institution. This risk-management data could be related to big-picture problems related to, e.g., a governance plan for an application serving millions of customers. The data in a risk-management data silo could pertain to an operating model for risk managers at the financial-services institution. In at least one embodiment that includes a risk-management data silo, the data contained therein could pertain to an integrated risk management application or set of applications.

In at least one embodiment, one of the data silos is an application-criticality-assessment data silo, which could include data that reflects how critical each application in the IT ecosystem is considered to be with respect to the ongoing functioning of the financial-services institution as a whole. In some instances, applications could be graded on a criticality scale into categories such as a high level of criticality, a medium level of criticality, and a low level of criticality. Certainly innumerable other delineations into criticality strata could be used in various different implementations. In some cases, the level of criticality of a given application could reflect factors such as whether or not the application is a customer-facing application, where an application being customer-facing would tend to increase the level of criticality of that application. In some instances, an application-criticality-assessment data silo could house data pertaining to an application tool.

Another example type of data silo that could be implemented is a vulnerability-management data silo, which may house data pertaining to one or more systems, applications, and/or the like that manage vulnerabilities of applications in an IT ecosystem. In at least some embodiments, and as contrasted with an "issue," which is a term used above in connection with discussion of an example risk-management data silo, a vulnerability could refer to an actual problem that has been identified with respect to the code (e.g., source code, executable code, interpretable code, and/or the like) of an application. Thus, in at least one embodiment, a vulnerability is a specific problem with the code of an application and requires a patch (i.e., a software patch) to be installed, applied, and/or the like in order to address and fix the vulnerability. In at least one embodiment, an example instance of a vulnerability-management data silo houses data that pertains to a platform or other set of vulnerability-management tools.

In at least one embodiment, one of the data silos is application-end-of-life-management data silo, which includes data that reflects whether or not certain applications in an IT ecosystem are at or nearing their end of life, which may refer to a date after which a vendor of a given application will no longer support that application. That support could include updates, patches, technical support, and/or the like. Continuing to operate an application in an ecosystem when that application is at or past its end-of-life date typically increases the probability that one or more incidents will occur in connection with that application.

Another example of a type of data silo that could be maintained is a risk-identification-and-mitigation data silo, which could house data related to monitoring whether various different software vendors have had problems, are high risk, and/or the like. This data silo could include data reflecting whether or not the financial-services institution that operates the IT ecosystem that includes these data silos has performed an assessment with respect to one or more software vendors. In some embodiments, a risk-identification-and-mitigation data silo includes data pertaining to a risk-identification-and-mitigation software suite.

One example of a type of data silo that could be maintained is a shared-risk-platform data silo, which could house data related to control failures (identified during control testing) and risk-management processes (e.g., overdue issues, corrective actions, etc.) for an application. Control failures and lax risk management can result in application problems.

Another example of a type of data silo that could be maintained is a software-infrastructure-and-standards data silo, which could house data related to software in an institution's infrastructure. Furthermore, this data silo could include data related to whether software is supported by a third party or by the institution that operates the IT ecosystem that includes these data silos. If software is not supported, required patches may not be produced or implemented to fix known vulnerabilities.

In at least one embodiment, the data silos include a project-management data silo, which could include data reflecting, e.g., how much money the financial-services institution that operates the IT ecosystem is spending on various applications for one or more purposes such as support, maintenance, patching, debugging, and/or the like. In at least one embodiment, a project-management data silo includes data pertaining to an application known as a Project Management Universal Work Station (PMUWS).

Another example of a type of data silo that could be implemented is referred to here as an IT-survey-assessment data silo. This example type of data silo could include data pertaining to one or more survey assessments carried out by one or more IT professionals with respect to one or more IT assets. These survey assessments could pertain to aspects such as how well various IT assets are functioning, whether or not one or more IT assets are experiencing data-quality issues, and/or the like.

As stated above, the depiction in FIG. 2 of the application-incident-management system 200 including four data silos is purely for illustration and by way of example and not limitation. That is, while in one example the system 200 may include four data silos, in other examples, any number of data silos could be present in a given implementation, and each data silo that is present in a given implementation could be used for any of the types of application data described above or any other type of application data deemed suitable by those of skill in the art for a given implementation. Furthermore, it is explicitly contemplated that data that pertains to a given application could be contained in one data silo or could be distributed, scattered, and/or the like across multiple data silos. That is, in one particular example, data for a single given application may be stored and distributed across two or more of data silo 202, data silo 204, data silo 206, and data silo 208 illustrated in FIG. 2. Moreover, the example data silos that are depicted in FIG. 2 could correspond to the data-store system 120 of FIG. 1.

As shown in FIG. 2, as part of at least some embodiments of the present disclosure, data is extracted from each of the data silo 202, the data silo 204, the data silo 206, and the data silo 208 and conveyed to the data-shaping platform 210. In particular, extracted data 222 is extracted from the data silo 202, extracted data 224 is extracted from the data silo 204, extracted data 226 is extracted from the data silo 206, and extracted data 228 is extracted from the data silo 208. Each of the extracted data 222, the extracted data 224, the extracted data 226, and the extracted data 228 is conveyed from its respective data silo to the data-shaping platform 210. With respect to each such data extraction, in at least one embodiment, less than all of the data that is contained in the respective data silo is extracted for use in connection with embodiments of the present disclosure. Rather, in at least one embodiment, certain select data fields are extracted for use in the herein-described embodiments. In some instances, these select data fields are those that have been identified by subject-matter experts as being useful in predicting application incidents. One such example is data fields that are related to software changes that were attempted to be installed but then had to be backed out (i.e., undone) for one or more reasons. Further examples of data fields that are included in the data extractions from the data silos are described below.

Various different types of data-extraction tools could be used for any one or more of the data extractions that are depicted in FIG. 2. One example toolset that could be used to conduct any of the extractions is an extraction function provided as part of Open Database Connectivity (ODBC), which is an application programming interface (API) for accessing database management systems (DBMSs).

As depicted in FIG. 2, each of the extracted data 222, the extracted data 224, the extracted data 226, and the extracted data 228 (collectively referred to herein at times as the "aggregated extracted data," is received into the data-shaping platform 210. After receiving the aggregated extracted data, the 210 performs a number of manipulations, transformations, calculations, and the like on the aggregated extracted data in order to transform the aggregated extracted data into a set of derived features for processing by one or more machine-learning models 214 in the machine-learning platform 212. In one sense, the aggregated extracted data is synthesized by the data-shaping platform 210 to provide a holistic view of the applications in the IT ecosystem. In an embodiment, the aggregated extracted data is received, transformed, and processed in accordance with the present disclosure once a month. However, other frequencies could be implemented in various different contexts.

As described here and elsewhere throughout the present disclosure, among the operations that are performed in various different embodiments on the aggregated extracted data by the data-shaping platform 210 are normalization operations, database (i.e., table) join operations, calculation of one or more metrics, data-quality checks, and/or the like. As an example, with respect to normalization, the data-shaping platform 210 may transform and aggregate one or more many-to-one relationships into respective one-to-one relationships to compute metrics such as averages, minimums, maximums, sums, and/or the like over various consolidated timeframes that may initially be expressed in multiple data records.

At least one result of these operations that are performed on the aggregated extracted data by the data-shaping platform 210 is the generation and/or identification of useful risk indicators, which are also referred to herein as being the features of the one or more machine-learning models 214. It is noted that the order in which various operations (e.g., normalizations, joins, and/or the like) are performed on various different subsets of the aggregated extracted data can depend on a number of factors, including whether or not a given one of the features is a function of data that is extracted from more than one of the herein-described data silos. Among the goals of the aggregation operations (e.g., calculations) that are performed on the aggregated extracted data is to identify and arrive at features for the machine-learning models 214 that are generally non-redundant and generally useful in predicting application incidents. An extensive list of example features used by one or more machine-learning models 214 is provided below in Table 1.

The aggregation operations that are performed on the aggregated extracted data result in the model-input data 230, which in at least one embodiment is transferred from the data-shaping platform 210 to the machine-learning platform 212 using data-movement software, another term for which is a data-movement tool, and one example of which is Network Data Mover (NDM) (a.k.a. Connect:Direct). As a general matter, a data-movement tool (e.g., NDM) is a set of software tools, applications, and/or the like that are collectively used to get complex data sets from one place to another. In at least one embodiment, the model-input data 230 is packaged in what is referred to in the art as a modeling export file that contains the generated risk indicators (i.e., features) discussed herein.

In at least one embodiment, the machine-learning platform 212 is configured to receive the model-input data 230 from the data-shaping platform 210, and is further configured to process the model-input data 230 using the one or more machine-learning models 214 as discussed herein, to produce model-output data 232, which is then transmitted by the machine-learning platform 212 to both an alert platform 216 and an admin interface 220. As described further below, in certain instances, the alert platform 216 processes the model-output data 232 and responsively transmits one or more alerts 234 to an alerts interface 218.

In various examples, the machine-learning platform 212 processes the model-input data 230 through the machine-learning models 214 to produce the model-output data 232. With respect to the one or more machine-learning models 214, these models in various different embodiments have one or more of the properties of being predictive and having been trained using supervised learning. In at least one embodiment, one or more of the machine-learning models 214 are gradient boosting machine (GBM) models. In some embodiments, at least two of the machine-learning models 214 are different types of machine-learning models. In other embodiments, each of the machine-learning models 214 is the same type of machine-learning model.

In some embodiments, at least one of the machine-learning models 214 is trained specifically to predict a certain type of application incident, such as patching-related incidents, access-related incidents, configuration-related incidents, and server-relationship-related incidents, to name a few examples. In some embodiments, the machine-learning models 214 include a first model trained to predict a first type of application incident and a second model trained to predict a second type of application incident, where the first type of application incident and the second type of application incident are different from one another.

In an embodiment in which one of the one or more machine-learning models 214 is trained specifically to predict patching-related incidents, features such as those listed below in Table 1 were used. These features were selected based on subject-matter expertise in key drivers of patching-related incidents as being applicable to root causes of patching-related incidents. In some embodiments, collinearity is identified and used as a basis to remove redundant features from the feature set used in operation by the patching-related-incident-specific machine-learning model. As a general matter in machine learning, it is desirable to select as features the smallest subset of independent variables that explains almost as much of the variation in the response as do all of the independent variables. Moreover, in some embodiments, false positives were accounted for by filtering out incidents that were determined to not be problematic.

Similarly, in some embodiments, at least one of the machine-learning models 214 is trained specifically to predict incidents for a certain application, such as a web-portal application, a bill-pay application, a statistical-analysis application, and/or the like. In some embodiments, the 214 include a first model trained to predict incidents for a first application and a second model trained to predict incidents for a second application, where the first application and the second application are different applications.

As a general matter with respect to implementing multiple machine-learning models 214, these models in at least some embodiments are independently trained using, e.g., supervised learning (i.e., learning that utilizes known, labeled results). Separate and independent models offer the benefit of a clear connection between variables in the respective model, and also enhance interpretability of the results of the inference function of the models.

The model-output data 232, which the alert platform 216 receives from the machine-learning platform 212 in at least one embodiment, could take the form of one or more assessments that indicate probabilities of application incidents (e.g., of particular types and/or with respect to particular applications) occurring. In some embodiments, these probabilities relate to the probability of such an incident occurring within a specified time frame such as one month, three months, six months, one year, and/or the like. In some instances, the machine-learning platform 212 compares these probabilities to one or more applicable probability thresholds, and then informs the alert platform 216 in the model-output data 232 as to whether or not one or more of such probabilities exceeded a respective threshold. In other embodiments, the model-output data 232 includes the probabilities themselves, and it is the alert platform 216 that makes the comparison to the one or more respective thresholds. Other approaches could be implemented as well.

In at least one embodiment, if it is determined (by, e.g., the machine-learning platform 212 and/or the alert platform 216) that at least one probability (i.e., likelihood) of an occurrence of an application incident exceeds a corresponding threshold, then the alert platform 216 outputs one or more corresponding alerts to the alerts interface 218. In various different embodiments, the alerts interface 218 could be or include one or more user-interface elements of one or more devices such as the laptop computer 124, the desktop computer 126, the laptop computer 112, the mobile device 114, and/or the like. In some embodiments, outputting an alert includes outputting an alert to one or more of a report, data storage, e-mail, one or more user interfaces (e.g., one or more digital dashboards), via one or more digital channels (e.g., messaging applications such as Slack, What's App, and/or the like) and/or one or more other suitable destinations. In an embodiment, the alert platform 216 could be programmed at least in part using the Python programming language. Other languages that could be used to develop any one or more of the entities described herein include Java, Java Platform, Enterprise Edition (J2EE), C++, and/or the like.

The content of a given alert could take any form deemed suitable by those of skill in the art for a given implementation. One example alert is described below in connection with FIG. 5. As a general matter, as examples, a given alert may identify the applicable application, the likely incident, one or more mandated and/or recommended actions, one or more mandated and/or recommended steps for remediation, mitigation, and/or the like, and/or one or more of any other data items or fields deemed suitable as alert content by those of skill in the art in a given context or for a given implementation. In some embodiments, alert data is accompanied by other data reflective of relevant application performance, maintenance, status, and/or the like.

As shown in FIG. 2, in some embodiments, the machine-learning platform 212 outputs the model-output data 232 not only to the alert platform 216 but also to the admin interface 220, which in various different embodiments could be a tool useable with respect to the application-incident-management system 200 for reviewing the results, changing parameters, and/or one or more other administrative functions deemed suitable by those of skill in the art for a given implementation. In at least one embodiment, the admin interface 220 is realized in whole or in part using a business-intelligence tool. In general, the admin interface 220 could be used to facilitate various different analytics and/or visual analyses to aid in the administration of the application-incident-management system 200.

Figure 3:
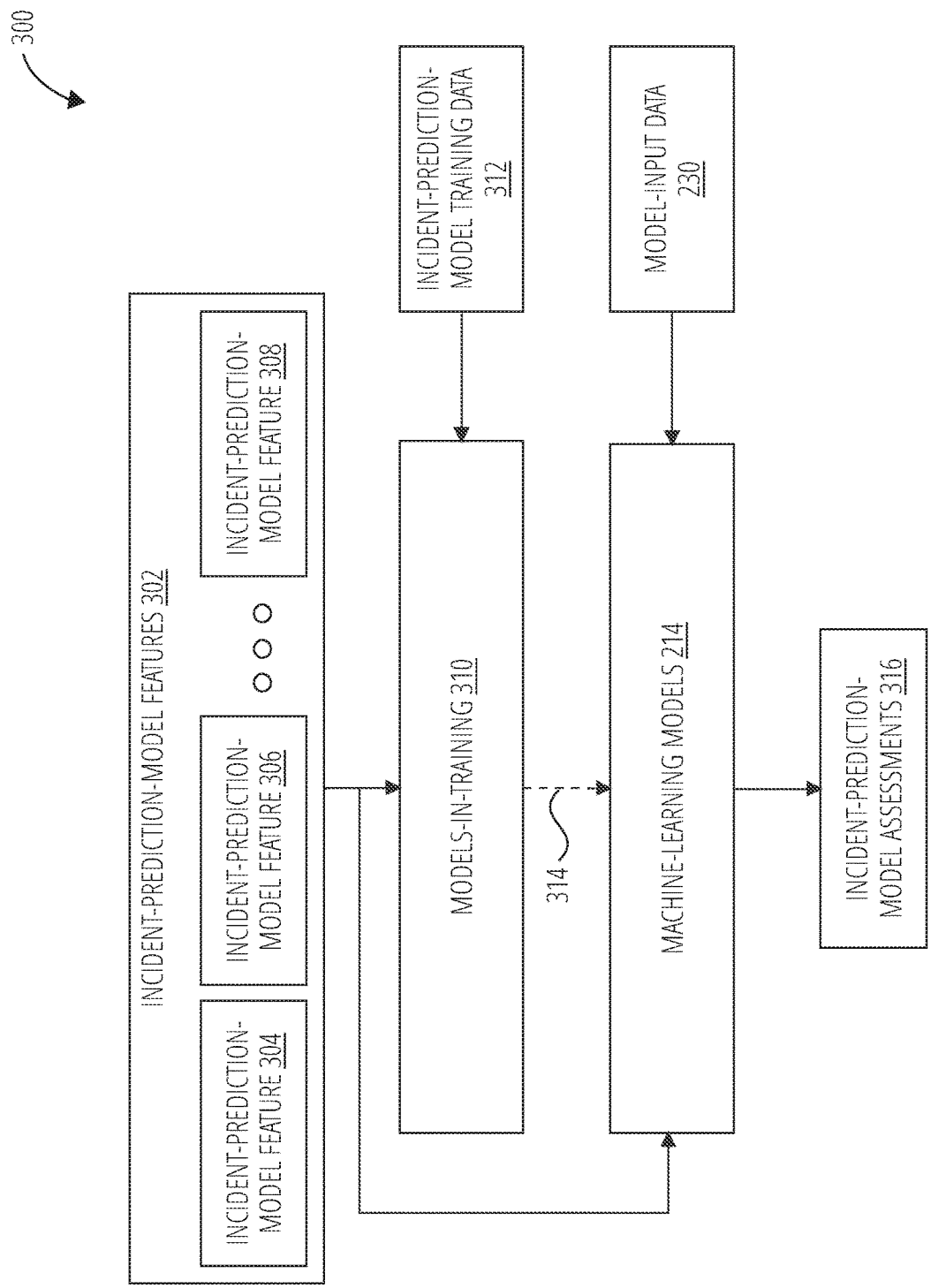
FIG. 3 illustrates an example machine-learning framework, in accordance with at least one embodiment.

FIG. 3 illustrates an example machine-learning framework 300 with respect to the one or more machine-learning models 214 of FIG. 2, in accordance with at least one embodiment. The machine-learning framework 300 that is depicted in FIG. 3, as well as this accompanying description, together with Table 1, are intended to give the reader an understanding of, in example embodiments, the structure as well as the content of both the training data and the machine-learning models 214, the process by which the machine-learning models 214 are trained, and the type of assessments that the machine-learning models 214 are trained to make. In FIG. 3, the data inputs and outputs are shown with solid-line arrows, whereas a transition 314 between a set of one or more models-in-training 310 and the corresponding one or more machine-learning models 214 is shown using a dashed-line arrow.

As an overview of the machine-learning framework 300, which is described in more detail below, it can be seen in FIG. 3 that the models-in-training 310 takes as their two inputs a set of incident-prediction-model features 302 and a set of incident-prediction-model training data 312, that the models-in-training 310 evolve at the transition 314 into the machine-learning models 214, and that the machine-learning models 214 take as their two inputs the incident-prediction-model features 302 and the model-input data 230, based on which the machine-learning models 214 generate incident-prediction-model assessments 316. It is noted that the incident-prediction-model features 302 can also be thought of as part of the structure of the models-in-training 310 and of the machine-learning models 214, and in that sense not necessarily a data input. Thus, once the machine-learning models 214 have been independently trained and are up and running "in production," the machine-learning models 214 take the model-input data 230 as their input and generate the incident-prediction-model assessments 316 as their output. Both the incident-prediction-model training data 312 and the model-input data 230 are structured according to the incident-prediction-model features 302.

Each of the incident-prediction-model features 302 is either an individual measurable property of the phenomenon being observed, which in embodiments of the present disclosure is operation of ecosystem applications, or a derived or aggregated (but still measurable and numeric) property of that phenomenon. In the machine-learning context, a feature is akin to an explanatory variable that is used in statistical techniques such as linear regression. Choosing informative, discriminating, and independent features is important for effective operation of machine-learning programs in pattern recognition, classification, and regression. Features may be of different types, such as numbers, character strings, and graphs. In FIG. 3, the incident-prediction-model features 302 are represented generally by an incident-prediction-model feature 304, an incident-prediction-model feature 306, and an incident-prediction-model feature 308, indicating an arbitrary number of incident-prediction-model features 302. An example set of incident-prediction-model features 302 that is used in at least one embodiment is listed below in Table 1.

In at least some embodiments, there are phases of training, validation, and testing in order to complete the transition 314 from the models-in-training 310 to the machine-learning models 214. Once the training, validation, and testing phases are complete, the machine-learning models 214 generate the incident-prediction-model assessments 316 based on the model-input data 230. In at least one embodiment, each of the incident-prediction-model assessments 316 is a likelihood (e.g., probability) of the occurrence (e.g., within a specified or default timeframe) of one or more application incidents.

Within the field of artificial intelligence (AI), machine learning is a subcategory in which computer systems are designed and created to be able to automatically learn and improve from experience without being explicitly (further) programmed. Within machine learning, there are at least three categories: reinforcement learning, unsupervised learning, and supervised learning. Reinforcement learning involves the use of various algorithms such as Monte Carlo, Q-learning, SARSA (state-action-reward-state-action), and/or the like. Unsupervised learning involves the use of various algorithms such as clustering algorithms, association algorithms, and/or the like. Embodiments of the present disclosure involve training a model using supervised learning—accordingly, various example supervised-learning algorithms are discussed herein.

Generally speaking, within the category of machine learning known as supervised learning, there are algorithms used for problems such as regression and classification. Regression algorithms (e.g., linear regression) are typically used to determine a numerical answer to a given problem (e.g., in the context of real-estate transactions, "What is the best price at which I should list my house?"), whereas classification algorithms are used to select one of multiple discrete outcomes (e.g., in the context of facial recognition, "Is this particular face that of an authorized user or not?"). As a general matter, the individual data items (e.g., images of faces in the example context of facial recognition) that are classified using a classification algorithm are referred to as observations, and the classification of a given new observation (as, e.g., "an authorized user" or "not an authorized user") is referred to as an assessment. The process of making such assessments is often referred to as inference.

Further with respect to training, machine-learning techniques train models to accurately make predictions on data fed into the models. During a learning phase, the models are developed against a training dataset of inputs to train the models to correctly predict the output for a given input. Generally, the learning phase may be supervised, semi-supervised, or unsupervised, indicating a decreasing level to which the "correct" outputs are provided in correspondence to the training inputs. In a supervised-learning approach, as described herein in connection with embodiments of the present disclosure, all of the outputs are provided to the model, guiding the model to develop a general rule that maps the input to the output. In contrast, in an unsupervised-learning approach, the desired output is not provided for the inputs; as such, the model can develop its own rules to discover relationships within the training dataset. In a semi-supervised learning approach, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised-learning approach, a model is developed to predict the output for a given set of inputs, and is evaluated over several epochs to more reliably provide the output that is specified as corresponding to the given input for the training dataset. In another example, in an unsupervised-learning approach, a model is developed to cluster the training dataset into n groups, and is evaluated over several epochs as to how consistently it places a given input into a given group and how reliably it produces the it desired clusters across each epoch.

Once an epoch is run, the models are evaluated and the values of their variables (e.g., coefficients) are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine-learning technique being used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several machine-learning algorithms that may be applied with the present disclosure, including linear regression, GBMs, random forests, decision-tree learning, neural networks, deep neural networks, and the like.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end "early," and the produced model may be used as satisfying the end-goal accuracy threshold. Similarly, if a given model is inaccurate enough to satisfy a random-chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs-having reached a performance plateau—the learning phase for the given model may terminate before the epoch number and/or computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it has not been trained. In a second example, a false-positive rate or false-negative rate is used to evaluate the models after finalization. In a third example, a delineation between data clusterings is used to select a model that produces the clearest bounds for its clusters of data. Other approaches may be used as well.

During training, in at least one embodiment, the models-in-training 310 builds classifiers (i.e., trees), and each such tree assesses each data point (i.e., vector) in the incident-prediction-model training data 312. As the training continues, the trees are formed, and the coefficients are adjusted. Once the training reaches a certain amount of time, iterations, and/or accuracy (as compared with the known labels), the training stops. In at least one embodiment, after training, an automated-validation phase is conducted. Prior to the training phase, the incident-prediction-model training data 312 may be divided into what is referred to herein as "pure training data," "validation data," and "testing data." In other embodiments, only "pure training data" and "testing data" are used, in which case there is not an automated-validation phase. In some embodiments that use the automated-validation phase, the incident-prediction-model training data 312 may be divided randomly into 60% pure training data, 20% validation data, and 20% testing data. Other divisions could be used as well. In embodiments that use only pure training data and testing data, a split such as 70%/30% or another suitable value could be used.

After the automated-validation phase (if conducted), a testing phase is also conducted. During both the automated-validation phase and the testing phase, the models-in-training 310 are tested by submitting vectors that had not yet been seen, and checking the outputs of the models-in-training 310 against known, labeled outputs. If a satisfactory accuracy level is reached in both phases, the transition 314 is considered to be complete and the machine-learning models 214 are accordingly ready to conduct inferences on the model-input data 230. It is also noted that, in addition to suitable accuracy levels, those accuracy levels are checked in some embodiments to verify that they are within a tolerance of the accuracy level being achieved near the end of the training phase. If the training accuracy more than an acceptable tolerance higher than either or both of the validation accuracy and the testing accuracy, the model can said to be overfitting the training data. If, on the other hand, the training accuracy is more than an acceptable tolerance lower than either or both of the validation accuracy and the testing accuracy, the model can said to be underfitting the training data. It is generally desirable to avoid both.

Figure 4:
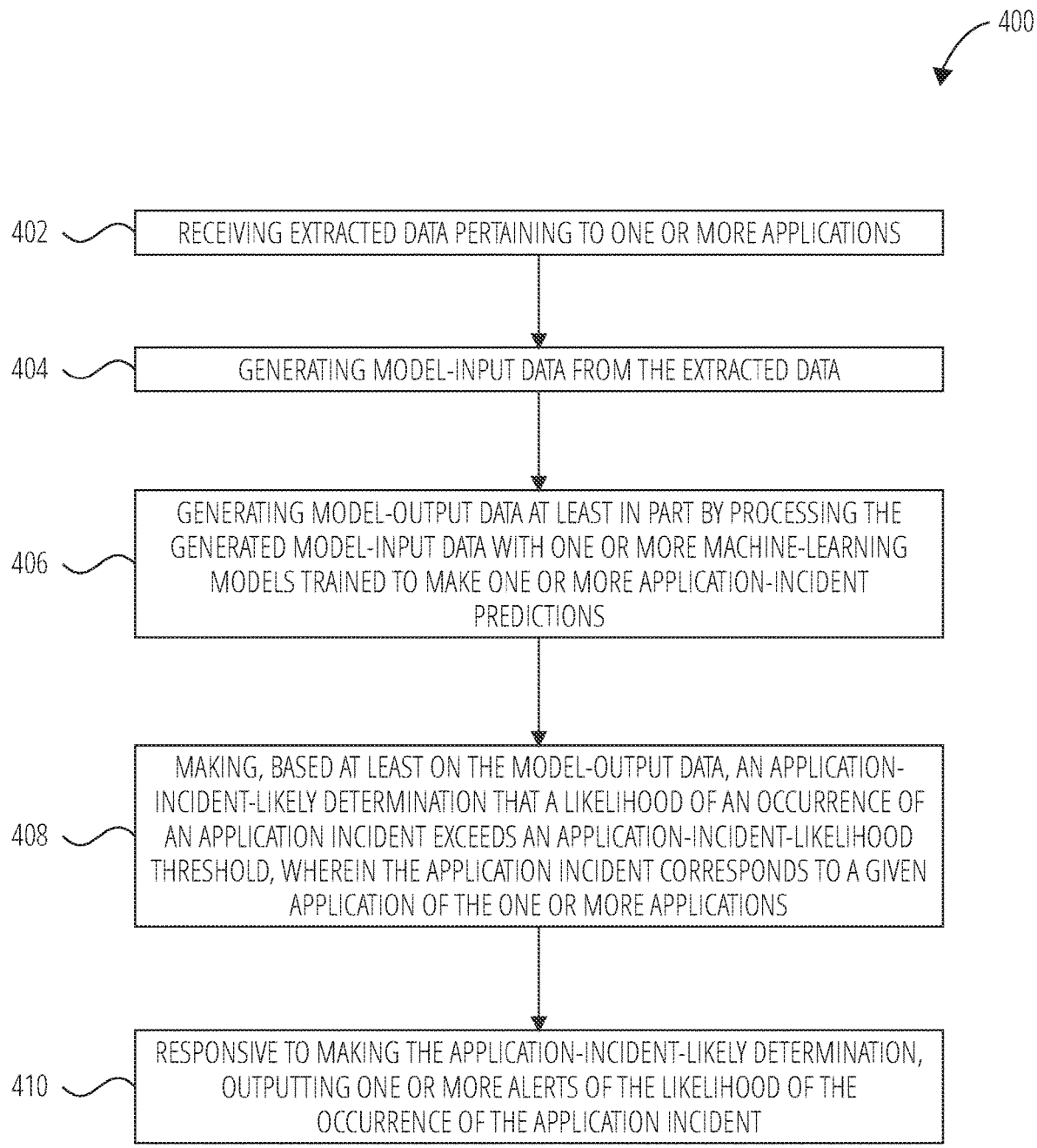
FIG. 4 illustrates an example method of using machine learning for managing application incidents, in accordance with at least one embodiment.

FIG. 4 illustrates an example method 400 method of using machine learning for managing application incidents, in accordance with at least one embodiment. In at least one embodiment, the method 400 is performed by a single device such as the machine-learning platform 212. In at least one other embodiment, the method 400 is performed by a combination of multiple devices, systems, and/or the like; for example, the method 400 could be performed by a combination of the data-shaping platform 210, the machine-learning platform 212, and the alert platform 216, among other possibilities. As a general matter, the method 400 could be performed by any one or any combination of devices, systems, and/or the like that are suitably equipped, programmed, and configured to perform the operations described herein. By way of example and not limitation, and for convenience of description, the method 400 is described below as being performed by various entities within the application-incident-management system 200, with the understanding that, as examples, any one or more entities within the application-incident-management system 200 could perform the recited operations.

At operation 402, the data-shaping platform 210 receives the aggregated extracted data, which pertains to one or more applications. At operation 404, the data-shaping platform 210 generates the model-input data 230 from the aggregated extracted data, as described above. At operation 406, the machine-learning platform 212 generates the model-output data 232 at least in part by processing the generated model-input data 230 with one or more machine-learning models 214 trained to make one or more application-incident predictions.

At operation 408, based at least in part on the model-output data 232, the alert platform 216 makes an application-incident-likely determination that a likelihood of an occurrence of an application incident exceeds an application-incident-likelihood threshold, where the application incident corresponds to a given application of the one or more applications. In at least one embodiment, the application incident has a particular incident type (e.g., patching-related), and the one or more machine-learning models 214 include an incident-type-specific machine-learning model trained to make application-incident predictions corresponding to application incidents having that particular incident type. In at least one such embodiment, the alert platform 216 makes the application-incident-likely determination based at least in part on output data from the incident-type-specific machine-learning model.

At operation 410, responsive to making the application-incident-likely determination, the alert platform 216 outputs one or more alerts 234 of the likelihood of the occurrence of the application incident. In at least one embodiment, operation 410 involves presenting the one or more alerts via one or more user interfaces such as the alerts interface 218. In at least one embodiment, operation 410 involves outputting the one or more alerts 234 to one or more of data storage, a computing device, and a networked server. Moreover, as discussed above, in at least one embodiment, in addition to outputting the model-output data 232 to the alert platform 216, the machine-learning platform 212 also outputs the model-output data 232 to the admin interface 220.

Figure 5:
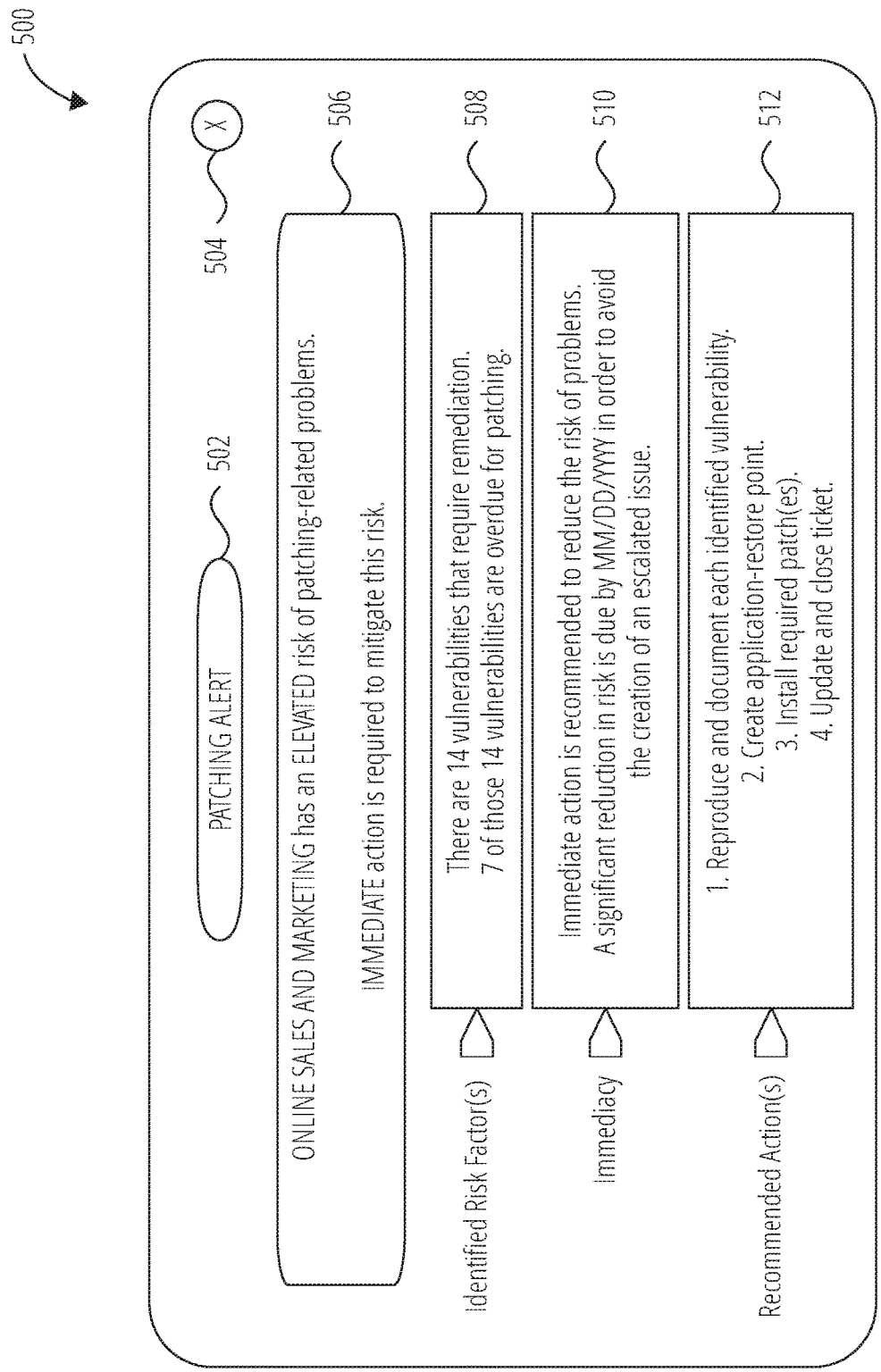
FIG. 5 illustrates an example alert that may be issued by the application-incident-management system of FIG. 2, in accordance with at least one embodiment.

FIG. 5 illustrates a sample alert 500 that may be issued by the alert platform 216, in accordance with at least one embodiment. The sample alert 500 is presented by way of example and not limitation, as various different types of content, format, and/or the like could be used in connection with various different embodiments.

The sample alert 500 includes a title bar 502 that indicates the type of incident, in this case patching alert, to which a user is being alerted, and also includes an alert-close element 504, which a user could click on or otherwise select to stop viewing the sample alert 500. Also included in the sample alert 500 is a headline 506, which in this case indicates that an example application called "Online Sales and Marketing" has an elevated level of risk of experiencing one or more patching-related problems. The headline 506 further indicates that "immediate" action is required to mitigate this risk.

In addition to the above-described elements, the sample alert 500 also includes a risk-factor segment 508 in which one or more identified risk factors can be included. In the depicted example, the risk-factor segment 508 includes text stating that this particular application currently has 14 vulnerabilities that require remediation, and further states that 7 of those 14 vulnerabilities are overdue for patching.

The sample alert 500 also includes an immediacy segment 510, which includes text conveying the relative immediacy of the information contained in the sample alert 500. In the depicted example, that text states that immediate action is required to reduce the risk of problems, and further states that a significant reduction in risk is due by a certain date in order to avoid the creation of an escalated issue.

Additionally, the sample alert 500 includes an action segment 512 that includes text communicating one or more recommended actions that the receiver of the sample alert 500 should take. In the depicted example, the first recommended action is to reproduce and document each identified vulnerability. The second recommended action is to create an application-restore point so that any changes can be backed out if need be. The third recommended action is to install the required patch(es). Finally, the fourth recommended action is to update and close the ticket. In various different embodiments, the content of various alerts may be based on business logic for risk items that are actually within an application owner's ability to control (i.e., although predictions may be based on large data sets, alerts may highlight actionable items (e.g., based on actionable features)).

Other example alert text could relate to such topics as an application being past its respective end-of-life date, in some embodiments by more than a threshold amount of time (e.g., six months); an application being past its expected retirement date, in some embodiments by more than a threshold amount of time (e.g., one year); a number of applications residing on a given host that are, e.g., past end-of-life, past expected retirement date, and/or the like. Other examples could be listed as well.

By operation of the alerts as well as the other operations described herein, embodiments of the present disclosure enable actions such as decommissioning unhealthy applications (e.g., those applications that have incidents), enable more efficient resource allocation (e.g., to address the key drivers of unhealthy applications), and provide personnel such as risk managers with a tool for proactive risk mitigation on an application-by-application basis, and an incident-by-incident basis.

Figure 6:
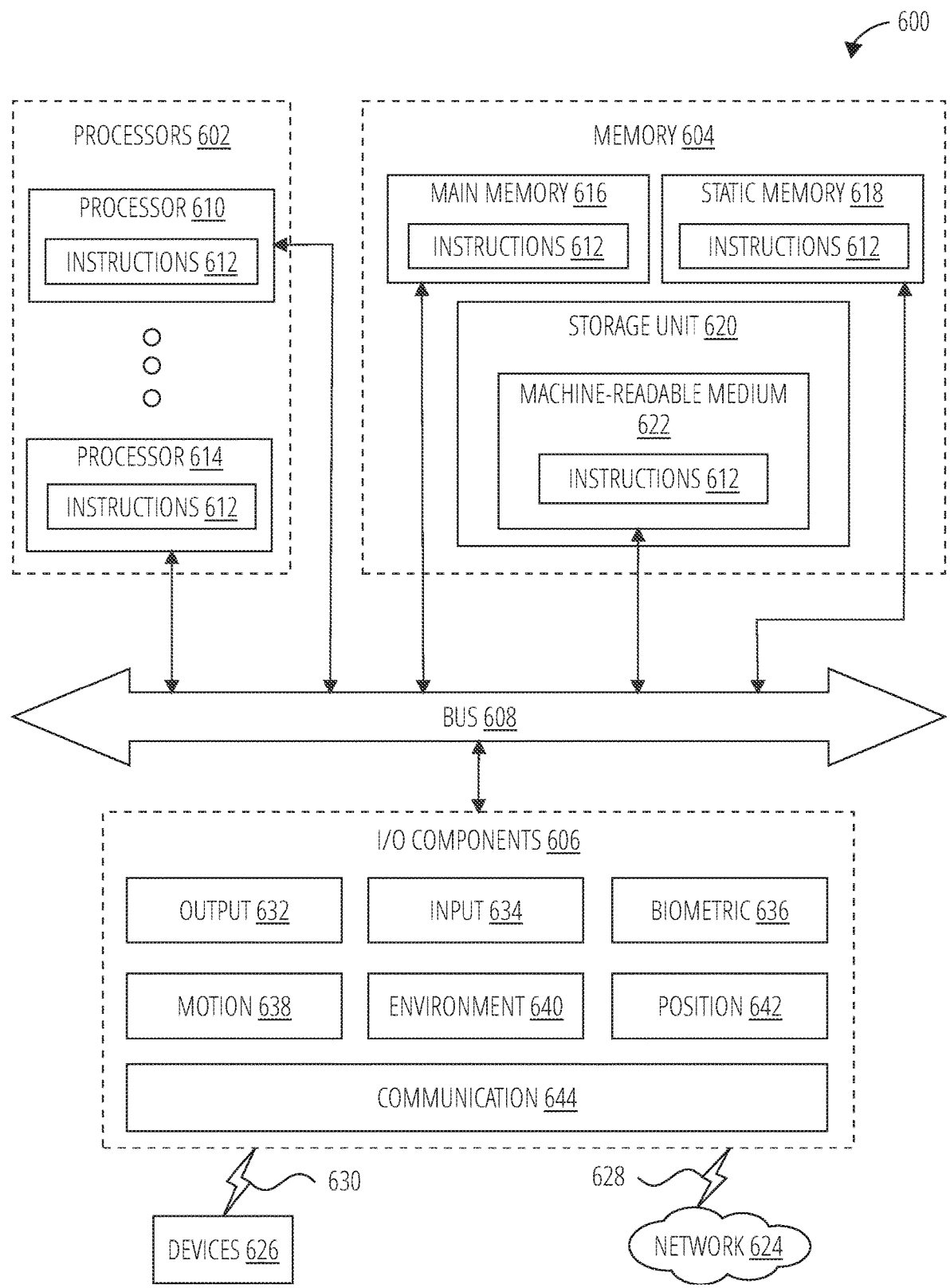
FIG. 6 illustrates a machine in the form of a computer system within which a set of instructions may be executed for causing the machine to perform any one or more of the methodologies discussed herein, in accordance with at least one embodiment.

FIG. 6 is a diagrammatic representation of a machine 600 within which instructions 612 (e.g., software, a program, an application, an applet, an app, and/or other executable code) for causing the machine 600 to perform any one or more of the methodologies discussed herein may be executed. For example, the instructions 612 may cause the machine 600 to execute any one or more of the methods described herein. The instructions 612 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may be or include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 612, sequentially or otherwise, that specify actions to be taken by the machine 600. Further, while only a single machine 600 is illustrated, the term "machine" shall also be taken to include a collection of machines that individually or jointly execute the instructions 612 to perform any one or more of the methodologies discussed herein.

The machine 600 may include processors 602, memory 604, and I/O components 606, which may be configured to communicate with each other via a bus 608. In an example embodiment, the processors 602 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 610 and a processor 614 that execute the instructions 612. The term "processor" is intended to include multi-core processors that may include two or more independent processors (sometimes referred to as "cores") that may execute instructions contemporaneously. Although FIG. 6 shows multiple processors 602, the machine 600 may include a single processor with a single core, a single processor with multiple cores (e.g., a multi-core processor), multiple processors with a single core, multiple processors with multiples cores, or any combination thereof.

The memory 604 includes a main memory 616, a static memory 618, and a storage unit 620, all accessible to the processors 602 via the bus 608. The memory 604, the static memory 618, and/or the storage unit 620 may store the instructions 612 embodying any one or more of the methodologies or functions described herein. The instructions 612 may also or instead reside, completely or partially, within the main memory 616, within the static memory 618, within machine-readable medium 622 within the storage unit 620, within at least one of the processors 602 (e.g., within the processor's cache memory), and/or any suitable combination thereof, during execution thereof by the machine 600.

The I/O components 606 may include a wide variety of components to receive input, produce and/or provide output, transmit information, exchange information, capture measurements, and/or the like. The specific I/O components 606 that are included in a particular instance of the machine 600 will depend on the type of machine. For example, portable machines such as mobile phones may include a touch input device or other such input mechanisms, while a headless server machine may not include such a touch input device. It will be appreciated that the I/O components 606 may include many other components that are not shown in FIG. 6. In various example embodiments, the I/O components 606 may include output components 632 and input components 634. The output components 632 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 634 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 606 may include biometric components 636, motion components 638, environmental components 640, and/or position components 642, among a wide array of other components. For example, the biometric components 636 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification, and/or the like), and/or the like. The motion components 638 may include acceleration sensor components (e.g., an accelerometer), gravitation sensor components, rotation sensor components (e.g., a gyroscope), and so forth. The environmental components 640 may include, for example, illumination sensor components (e.g., a photometer), temperature sensor components (e.g., one or more thermometers), humidity-sensor components, pressure-sensor components (e.g., a barometer), acoustic-sensor components (e.g., one or more microphones), proximity-sensor components (e.g., infrared sensors that detect nearby objects), gas sensors (e.g., gas-detection sensors to detection concentrations of hazardous gases for safety or to measure pollutants in the atmosphere), and/or other components that may provide indications, measurements, signals, and/or the like that correspond to a surrounding physical environment. The position components 642 may include location-sensor components (e.g., a global positioning system (GPS) receiver), altitude-sensor components (e.g., altimeters or barometers that detect air pressure from which altitude may be derived), orientation-sensor components (e.g., magnetometers), and/or the like.

Communication may be implemented using a wide variety of technologies. The I/O components 606 may further include communication components 644 operable to communicatively couple the machine 600 to a network 624 and/or devices 626 via a coupling 628 and/or a coupling 630, respectively. For example, the communication components 644 may include a network-interface component or another suitable device to interface with the network 624. In further examples, the communication components 644 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 626 may include one or more other machines and/or any of a wide variety of peripheral devices (e.g., a peripheral device coupled via a universal serial bus (USB) connection).

Moreover, the communication components 644 may detect identifiers or include components operable to detect identifiers. For example, the communication components 644 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 644, such as location via Internet Protocol (IP) geolocation, location via Wi-Fi signal triangulation, location via detecting an NFC beacon signal that may indicate a particular location, and/or the like.

One or more of the various memories (e.g., the memory 604, the main memory 616, the static memory 618, and/or the memory of the processors 602) and/or the storage unit 620 may store one or more sets of instructions and data structures (e.g., software) embodying or used by any one or more of the methodologies or functions described herein. These instructions (e.g., the instructions 612), when executed by processors 602, cause various operations to implement the disclosed embodiments.

The instructions 612 may be transmitted or received over the network 624, using a transmission medium, via a network-interface device (e.g., a network-interface component included in the communication components 644) and using any one of a number of well-known transfer protocols (e.g., the Session Initiation Protocol (SIP), the hypertext transfer protocol (HTTP), and/or the like). Similarly, the instructions 612 may be transmitted or received using a transmission medium via the coupling 630 (e.g., a peer-to-peer coupling) to the devices 626.

Figure 7:
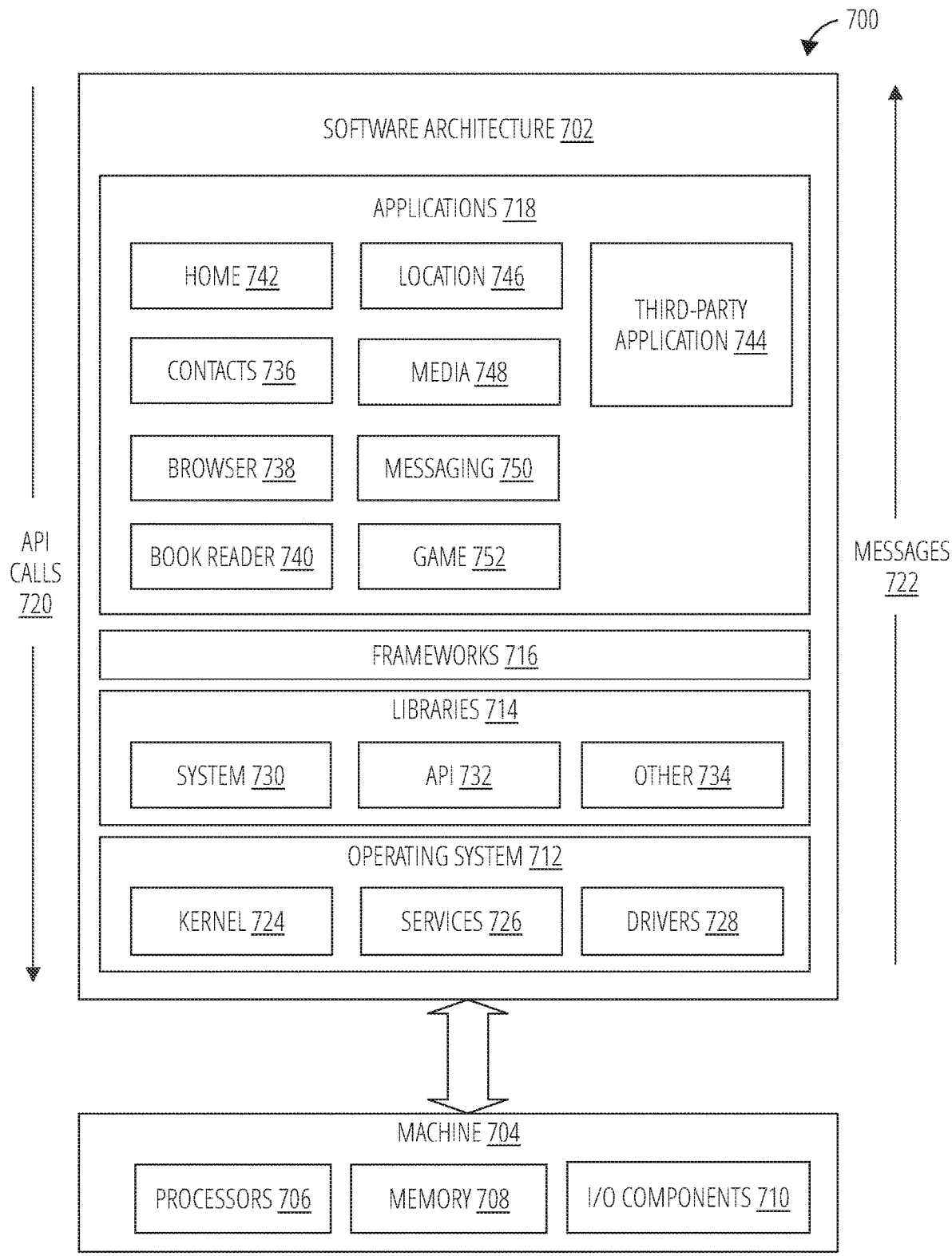
FIG. 7 illustrates a software architecture within which one or more embodiments of the present disclosure may be implemented, in accordance with at least one embodiment.

FIG. 7 is a block diagram 700 illustrating a software architecture 702, which can be installed on any one or more of the devices described herein. For example, the software architecture 702 could be installed on any device or system that is arranged similar to the machine 600 of FIG. 6. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such an operating system 712, libraries 714, frameworks 716, and applications 718. Operationally, using one or more application programming interfaces (APIs), the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 may provide memory management, processor management (e.g., scheduling), component management, networking, and/or security settings, in some cases among other functionality. The services 726 can provide other common services for the other software layers. The drivers 728 are responsible for controlling or interfacing with the underlying hardware. For instance, the drivers 728 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 714 provide a low-level common infrastructure used by the applications 718. The libraries 714 can include system libraries 730 (e.g., C standard library) that provide functions such as memory-allocation functions, string-manipulation functions, mathematic functions, and/or the like. In addition, the libraries 714 can include API libraries 732 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in a graphic content on a display), database libraries (e.g., SQLite to provide various relational-database functions), web libraries (e.g., WebKit to provide web-browsing functionality), and/or the like. The libraries 714 can also include a wide variety of other libraries 734 to provide many other APIs to the applications 718.

The frameworks 716 may provide a high-level common infrastructure that is used by the applications 718. For example, the frameworks 716 may provide various graphical user interface (GUI) functions, high-level resource management, high-level location services, and/or the like. The frameworks 716 can provide a broad spectrum of other APIs that can be used by the applications 718, some of which may be specific to a particular operating system or platform.

Purely as representative examples, the applications 718 may include a home application 742, a contacts application 736, a browser application 738, a book-reader application 740, a location application 746, a media application 748, a messaging application 750, a game application 752, and/or a broad assortment of other applications generically represented in FIG. 7 by a third-party application 744. The applications 718 are programs that execute functions defined in the programs. Various programming languages can be employed to create one or more of the applications 718, structured in a variety of manners, such as object-oriented programming languages (e.g., Objective-C, Java, C++, and/or the like), procedural programming languages (e.g., C, assembly language, and/or the like), and/or the like. In a specific example, the third-party application 744 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 744 can invoke the API calls 720 provided by the operating system 712 to facilitate functionality described herein.

TABLE 1

Example Features:

| Feature Name | Definition | Significance |
| --- | --- | --- |
| Access Recertification | Access recertification process in place. Authorization is granting of permissions to an authenticated user or account to access functions within the application. Authorization may include the level of access to be allowed such as "read only" or "update." For example: a manager may have permissions to update salary information and a delegate may only have the ability to view salary information. | Access recertification mitigates risk of application-security violations |
| Reliability (Frequency of Defects) | Over the past year, how often the application has produced incorrect results given correct inputs, or produced incorrect results because of failure to detect invalid inputs (e.g., duplicate postings, using yesterday's file input, accepting the same online transaction twice, accepting invalid inputs in an online transaction, etc.) | This captures the application's effectiveness at providing accurate results |
| Number of Active Sarbanes-Oxley (SOX) Controls | Number of active SOX Controls | SOX controls are mandated by Congress under the reformed regulatory standards. They are designed to protect investors from the possibility of fraudulent accounting activities by corporations. |
| Application Key | The unique identifier | Application Key uniquely identifies the application/metric month combo for creating the model and joining the model results back to the master data set for presentation |
| Application Life Span | Estimated number of years until the application will be retired or require substantial investment for modernization. | Prolonged need for retirement or modernization may pose application security risk due to outdated technology and relevancy |
| Number of Third-Party Risk Assessments Past Due | Number of 3rd-party risk assessments that are past due | Past-due third party risk assessments indicate potential for unidentified risks with vendor |
| Automated Controls | Number of automated Controls | Automated controls are more effective than Manual controls, with less room for human error and higher efficiency |
| Business Continuity Plan (BCP) | Identifies whether the application has a Business Continuity Plan identified in the system of record | BCPs enable a business to respond to accidents, disasters, emergencies, and/or threats without any stoppage or hindrance in its key operations. Without proper BCP in place, the organization cannot recover to an operational state in |

TABLE 1-continued

Example Features:

| Feature Name | Definition | Significance |
| --- | --- | --- |
| | | case of serious incidents or disasters. Areas exposed include Resilience, Recovery, and Contingency |
| Vendor Business Logic | Is some or the majority of the application's business logic provided by vendor software? Business logic does not include middleware. | If the application's business logic is provided by vendor software, it can be exposed to Third-Party Risk |
| Card Processing | Does the application store, process, or transmit full credit or debit-card account numbers? | Applications that store, process, or transmit credit or debit card numbers are exposed to cyber security threats and fraud risk |
| Number of Corrective Actions at Risk | Open corrective actions that have been flagged as at risk to be completed by their due date | Applications with corrective actions at risk have acknowledged systemic issues to be resolved, and are encountering delays to closing out corrective actions according to schedule |
| Detective Controls | Number of Controls that are Detective | Internal controls are either directive, preventive or detective. Detective controls are intended to uncover the existence of errors, inaccuracies or fraud that has already occurred. |
| Directive Controls | Number of Controls that are Directive | Internal controls are either directive, preventive or detective. Directive controls are those designed to establish desired outcomes |
| Number of Failed Controls | Number of Controls Failed | Controls that are failing are doing very little or none of what they are meant to do |
| Key Controls | Number of Key Controls | Key controls are internal control that have a pervasive affect upon the accomplishment of management's control objectives. |
| Non-Key Controls | Number of Non-Key Controls | Non-key controls mitigate the low risk areas of an organization |
| Not-Failing Controls | Number of Controls Not Failed | Controls that are NOT failing are doing mostly or all of what they are meant to do |
| Number of Non-Reviewed Controls | Number of Controls not reviewed | Controls that are not reviewed are not assessed for their effectiveness |
| Preventive Controls | Number of Preventive Controls | Internal controls are either directive, preventive or detective. Preventive controls are designed to prevent errors, inaccuracy or fraud before it occurs. |
| Primary Controls | Number of Primary Controls | Primary controls are the foremost controls to mitigate risk |
| Criticality | The criticality of an application | Application criticality reflects the application's significance to the enterprise |
| Distributed Application | Indicator of application's using a distributed platform | Understanding the type of platform hosting the application is key to understanding the risks the application is exposed to |
| Mainframe Application | Indicator of application's using a mainframe platform | Understanding the type of platform hosting the application is key to understanding the risks the application is exposed to |

TABLE 1-continued

Example Features:

| Feature Name | Definition | Significance |
| --- | --- | --- |
| Customer Facing | An application is customer facing if customers deal directly with it | Customer facing application exposes the company to additional cyber security risk, as well as reputational risk. It also implies an increased number of users which increase the inherent risk. |
| Data at Rest Encrypted According to Policy | Flag to identify if the data at rest is encrypted according to policy. | Storing data that is not encrypted according to enterprise standards may increase information security risks |
| Is Data at Rest Encrypted? | Indicates whether or not the application employs an encryption solution for data at rest | Encryption for data at rest is a control for application security |
| Data Classification | Indicates the classification of the data used by the application | More sensitive data carries greater risk exposure than less sensitive data |
| Data in Motion Encrypted According to Policy | Flag to identify if the data in motion is encrypted according to policy. | Transmitting data that is not encrypted according to enterprise standards may increase information security risks |
| Is Data in Motion Encrypted? | Indicates whether or not the application employs an encryption solution for data in motion | Encryption for data in motion is a control for app security |
| Application DMZ Hosted | Is any portion of the application-including servers, load balancers, proxies, and appliances-hosted in a DMZ | DMZ hosting carries a different risk exposure than traditionally hosted solutions |
| Monthly Number of Emergency Changes | Number of changes that have a lead time of "Emergency". | A larger number of changes submitted to fix specific incidents is a trailing indicator for an unhealthy application |
| Vendor Engagement Risk Assessment Inherent Risk | Inherent Risk identified from a relationship with a Third Party Vendor | The engagement with the third party vendor has an inherent risk that is part of the application's overall inherent risk |
| Vendor Engagement Risk Assessment Residual Risk | Residual Risk identified from a relationship with a Third Party Vendor | The engagement with the third party vendor has a residual risk that contributes to the application's overall residual risk |
| Enterprise Authentication | Authentication method exists to verify the identity of a person, device, or entity, often as a prerequisite to allowing access to a system or facility. | Enterprise authentication is an automated control to prevent unauthorized access to data and information. |
| Monthly Number of Exception Changes | Number of changes that have a lead time of "Exception". | A larger number of changes submitted against the group policy change timeline indicates processes not being followed as well as potential gaps in thorough testing |
| Externally Facing | Flag to identify if the application directly supports other applications that communicate externally over Internet, VPN, or Extranet connections | External facing applications can present additional reputational risk if services are not always available or functioning as expected for customers. |
| Externally Hosted | Flag to identify if an application is externally hosted, whether completely or in part | External hosting can introduce additional risk compared to internal hosting, and represent a different risk portfolio |
| Extranet Communication | Flag to identify if the application communicates across private (Extranet) connections with third parties | External communications can present additional risk into an application |

TABLE 1-continued

Example Features:

| Feature Name | Definition | Significance |
| --- | --- | --- |
| Global Resources | Flag to identify if the application is/was built, delivered and/or maintained by resources located in one or more particular countries | Understanding the support structure is critical to understanding how the application team is able to respond to potential and actual failures |
| Application Implementation Year | The year that the application was deployed | Implementation year is important to consider for modernization needs |
| Access Related Incidents | Flag to identify if the application has any access related incidents | The presence of Access Related Issues may be a dependent variable for a predictive model. |
| Patch Related Incidents | Flag to identify if the application has any patch related incidents | The presence of Patch Related Issues may be a dependent variable for a predictive model. Patch Related Issues can be indicative of insufficient testing and may cause interruptions in business availability |
| Number of Issues at Risk | Number of open issues that are flagged as being at risk to be completed by the current due date | Issues represent known faults within an application's function or operations, and having issues at risk of being completed within their due date increases the risk of those faults manifesting into material loss |
| Number of Open Corrective Actions | Number of corrective actions that are open related to the application | Open corrective actions indicate a known risk has not been completely remediated |
| IP Address Handling | Flag to identify if the application stores or parses IP addresses | IP address leakage can lead to additional targeted attacks |
| Number of Non Self-Identified Issues | Number of open issues that were not self-identified | Issues represent known faults within application's function or operations, and having a higher percentage of issues that are identified from outside certain business or technology units in the organization may indicate increased risk potential |
| Number of Issues Past Due | Number of open issues that are past their current due date | Issues represent known faults within application's function or operations, and having issues not completed by their target due date indicates a failure to mitigate those faults within a target period |
| Access Control | Flag to identify if the application uses an Access Control System. An access control system is often custom developed, handling the authentication and/or authorization capabilities for another asset | Access controls prevent unauthorized access to data and leakage of information, having a large number of different access control systems leads to difficulty in standardizing procedures |
| Open Issues | The number of open issues related to this application | Open issues indicate a known risk has not been completely remediated |
| Mean Time to Vulnerability Remediation | The average time taken to deploy fixes to vulnerabilities once they are identified | Higher times taken to patch vulnerabilities leads to a higher potential for vulnerabilities to be exploited |
| VPN Connections | Flag to identify if the application communicates across VPN connections | Understanding the applications network connections is important to identify potential for leakage |

TABLE 1-continued

Example Features:

| Feature Name | Definition | Significance |
| --- | --- | --- |
| Monthly Number of Changes with Negative Impact | Number of changes that were identified as having a negative impact. A negative impact is any non-beneficial impact that was not described as a part of the business impact of the change | A larger number of changes that have a negative impact reduces the ability of the application to function as specified and can indicate insufficient testing |
| Mainframe Only | Flag to identify if the application runs only on a mainframe | Understanding the type of platform hosting the application is key to understanding the risks the application is exposed to |
| Support Group Recorded | Flag to identify if the application has a documented support group | Whether an application has an identified team to manage its health affects the application's ability to proactively manage risks and respond in the event of failure |
| On Publicly Accessible Infrastructure (PAI) | Flag to identify if the application sits on a PAI | Infrastructure that is publicly accessible is exposed to increased cyber security risk |
| Number of Unique Vulnerabilities | The number of total vulnerabilities | A larger number of identified vulnerabilities presents higher risk in terms of a wider range of targets to exploit |
| Publicly Accessible Application (PAA) | Flag to identify if the application is a PAA. PAAs are web applications (e.g. web site, social media, etc.), web-services, or mobile applications that are accessible from outside the corporate network over a publicly accessible network (e.g. Internet, cellular network) | Web applications that are publicly accessible are exposed to increased cyber security risk |
| Platform Group | Identifies if the application is distributed, midrange, or mainframe | The inherent and residual risk of the application depend on the security of the underlying platform |
| Change Approval Staff | The number of staff with change approval access | Change approval should be limited to only a few individuals to maintain the control effectiveness, if too many people have change approval access, then the change approval process will become irrelevant. |
| Support Staff | The number of staff tech support | Sudden reduction of application support staff over time can lead to app management/maintenance issues |
| Privileged Access Type | The type of privileged access to identify if user entitlements or roles are maintained | Privileged access control prevent unauthorized access to data and dissemination of information. |
| Public Internet | Flag to identify if the application communicates across the public internet | Applications that communicate across the public internet are exposed to increased cyber security risk |
| Risk Vulnerabilities | The number of vulnerabilities | This represents the intersection between the number of vulnerabilities and the number of applications affected by those vulnerabilities. |
| Recovery Time Objective (RTO), Recovery Point Objective (RPO), or Recovery Time Capability (RTC) Gaps | Flag to identify whether the application has BCP failure (RTO/RPO/RTC Gaps) | An identified gap in RTO/RPO/RTC indicates risk in the organization's Resilience, Recovery, and Contingency capabilities |

TABLE 1-continued

Example Features:

| Feature Name | Definition | Significance |
| --- | --- | --- |
| Service Accounts | Flag to identify whether the application uses service accounts that are specific to the application | The level of security for all manner of accounts is a very important aspect of any network security initiative. |
| Business Suitability | Assessment of how well this application meets current business needs | Suitability is important to operational efficiency and appropriate allocation of resources |
| Third Party Server Side Code | Does Third Party Server contain code? | Third Party server side code is additional channel of susceptibility for vulnerabilities and must be appropriately managed |
| Application RTO | Recovery Time Objective | Application Tiers may represent a reduced number of categories derived from the applications RTO used for modeling purposes. |
| User Access Suspension Process | Flag to identify if there is a capability or process in place for disabling or suspending application user access after, e.g., 90 days of inactivity | Leaving inactive users accounts open increases the inherent risk, and exposes institutions to fraudsters stealing inactive accounts to gain access to the internal network |
| Log of Users Affected | Log of the number of users of the application | The log of the number of users helps reduce the disparity between the smallest and largest |
| Non-Compliant Vulnerabilities | Number of vulnerabilities that are identified as non-compliant | The number vulnerabilities outside of compliance is a metric to understand remediations completed vs. planned, and lack of compliance to deadlines |
| AIX Vulnerabilities | Number of vulnerabilities on computer systems with an AIX operating system (OS) | Vulnerability breakdown by OS is important to identify risk by Operating System |
| HP-UX Vulnerabilities | Number of vulnerabilities on computer systems with an HP-UX OS | Vulnerability breakdown by OS is important to identify risk by Operating System |
| Linux Vulnerabilities | Number of vulnerabilities on computer systems with a Linux OS | Vulnerability breakdown by OS is important to identify risk by Operating System |
| Solaris Vulnerabilities | Number of vulnerabilities on computer systems with a Solaris OS | Vulnerability breakdown by OS is important to identify risk by Operating System |
| VMWare Vulnerabilities | Number of vulnerabilities on computer systems with a VMWare OS | Vulnerability breakdown by OS is important to identify risk by Operating System |
| Windows Vulnerabilities | Number of vulnerabilities on computer systems with a Windows OS | Vulnerability breakdown by OS is important to identify risk by Operating System |
| Number of Overdue Vulnerabilities | Number of vulnerabilities Overdue for Patches | Overdue vulnerabilities introduce a risk to application security that should have been resolved by remediation processes |
| Number of Overdue Vulnerabilities without Exception | Number of overdue vulnerabilities that do not have an exception | Overdue vulnerabilities without an exception introduce a risk to application security that should have been resolved by remediation processes |
| Number of Vulnerabilities requiring a patch | Number of vulnerabilities that require a patch for remediation | The number of vulnerabilities requiring patches to be fixed is useful for creating patching schedules and understanding capacity requirements |
| Application Vulnerabilities | Number of vulnerabilities classified as part of the Application product platform | Vulnerability breakdown by Asset Class is important to identifying concentration by Asset Type |

TABLE 1-continued

Example Features:

| Feature Name | Definition | Significance |
| --- | --- | --- |
| Database Vulnerabilities | Number of vulnerabilities classified as part of the Database product platform | Vulnerability breakdown by Asset Class is important to identifying concentration by Asset Type |
| Firmware Vulnerabilities | Number of vulnerabilities classified as part of the Firmware product platform | Vulnerability breakdown by Asset Class is important to identifying concentration by Asset Type |
| Middleware Vulnerabilities | Number of vulnerabilities classified as part of the Middleware product platform | Vulnerability breakdown by Asset Class is important to identifying concentration by Asset Type |
| OS Vulnerabilities | Number of vulnerabilities classified as part of the OS product platform | Vulnerability breakdown by Asset Class is important to identifying concentration by Asset Type |
| Other Product Vulnerabilities | Number of vulnerabilities classified as part of an "Other" product platform | Vulnerability breakdown by Asset Class is important to identifying concentration by Asset Type |
| PC Vulnerabilities | Number of vulnerabilities classified as part of the PC product platform | Vulnerability breakdown by Asset Class is important to identifying concentration by Asset Type |
| Emergency Severity Vulnerabilities | Number of vulnerabilities classified with a severity rating of Emergency | Counts by a threat score adds context around the severity of vulnerabilities being identified |
| High Severity Vulnerabilities | Number of vulnerabilities classified with a severity rating of High | Counts by a threat score adds context around the severity of vulnerabilities being identified |
| Low Severity Vulnerabilities | Number of vulnerabilities classified with a severity rating of Low | Counts by a threat score adds context around the severity of vulnerabilities being identified |
| Medium Severity Vulnerabilities | Number of vulnerabilities classified with a severity rating of Medium | Counts by a threat score adds context around the severity of vulnerabilities being identified |
| Software not past institution-specific end of life (EOL) | Number of software that are past institution-specific EOL but not retired within an app | Past EOL introduces risk exposure through unaddressed security gaps in software code |
| Monthly Software past institution-specific Retirement Date | Number of software that are past institution-specific retirement date and retired within an app | Past EOL and/or retirement date introduces risk exposure through unaddressed security gaps in software code |
| Software with Unknown institution-specific EOL status | Number of software that are past institution-specific EOL and unknown in retirement status within an app | Past EOL introduces risk exposure through unaddressed security gaps in software code |
| Third Party Hosted Application | Indicates whether an application is Third Party Hosted | Applications hosted by Third Party Vendors can have a greater inherent risk |

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method comprising:
receiving extracted data pertaining to a plurality of applications;
generating model-input data from the extracted data;
generating model-output data at least in part by processing the generated model-input data with a plurality of machine-learning models each independently trained to make one or more application-incident predictions, wherein the plurality of machine-learning models comprises a plurality of application-specific machine-learning models comprising:
a first machine-learning model that is trained using a training dataset specific to a first application and to a second application to make application-incident predictions with respect to the first application; and
a second machine-learning model that is trained using the training dataset to make application-incident predictions with respect to the second application different from the first application;
making, based at least in part on the model-output data, an application-incident-likely determination that a likelihood of an occurrence of an application incident exceeds an application-incident-likelihood threshold, the application incident corresponding to the first application or to the second application; and
responsive to making the application-incident-likely determination, outputting one or more alerts of the likelihood of the occurrence of the application incident.

2. The method of claim 1, wherein:
the model-input data is structured according to a set of one or more features;
generating the model-input data from the extracted data comprises transforming at least a portion of the extracted data into being structured according to the set of one or more features; and
processing the generated model-input data with the plurality of machine-learning models comprises processing the set of one or more features with the plurality of machine-learning models, wherein the set of one or more features are suitable for predicting the application incident corresponding to the first application and to the second application.

3. The method of claim 2, wherein:
receiving the extracted data comprises receiving the extracted data as a plurality of datasets respectively extracted from a plurality of different data stores; and
transforming at least a portion of the extracted data into being structured according to the set of one or more features comprises one or more of:
conducting at least one normalization function with respect to the at least a portion of the extracted data;
conducting at least one join operation with respect to the at least a portion of the extracted data;
conducting at least one metric calculation with respect to the at least a portion of the extracted data; and
conducting at least one data-quality check with respect to the at least a portion of the extracted data.

4. The method of claim 1, wherein:
a data-shaping platform generates the model-input data from the extracted data;
a machine-learning platform generates the model-output data at least in part by processing the generated model-input data with the plurality of machine-learning models; and
the method further comprises conveying the model-input data from the data-shaping platform to the machine-learning platform using data-movement software.

5. The method of claim 1, wherein the plurality of machine-learning models comprises one or more gradient boosting machine (GBM) models.

6. The method of claim 1, wherein the first type of application incident comprises an application-patching-related incident.

7. The method of claim 1, wherein the first type of application incident comprises an application-access-related incident.

8. The method of claim 1, wherein the first type of application incident comprises an application-configuration-related incident.

9. The method of claim 1, wherein the first type of application incident comprises an application-server-relationship-related incident.

10. The method of claim 1, wherein the plurality of machine-learning models further comprises:
a third machine-learning model that is trained to make application-incident predictions with respect to a first type of application incident; and
a fourth machine-learning model that is trained to make application-incident predictions with respect to a second type of application incident different from the first type of application incident.

11. The method of claim 1, wherein the application-incident-likely determination is that the likelihood of an occurrence of an application incident within a predetermined amount of time exceeds the application-incident-likelihood threshold.

12. The method of claim 1, wherein:
the model-output data indicates the likelihood of the occurrence of the application incident; and
making the application-incident-likely determination based at least in part on the model-output data comprises comparing the indicated likelihood to the application-incident-likelihood threshold.

13. The method of claim 1, wherein:
the model-output data comprises an indication that the likelihood of the occurrence of the application incident exceeds the application-incident-likelihood threshold; and
making the application-incident-likely determination based at least in part on the model-output data comprises making the application-incident-likely determination based at least in part on the indication.

14. The method of claim 1, further comprising presenting the one or more alerts via one or more user interfaces.

15. The method of claim 1, wherein outputting one or more alerts comprises outputting the one or more alerts to one or more of data storage, a computing device, and a networked server.

16. The method of claim 1, further comprising outputting the model-output data to an administrative interface.

17. The method of claim 1, further comprising:
making, based at least in part on the model-output data, a second application-incident-likely determination that a likelihood of an occurrence of a second application incident exceeds a second application-incident-likelihood threshold, the second application incident corresponding to the second application; and responsive to making the second application-incident-likely determination, outputting one or more alerts of the likelihood of the occurrence of the second application incident.

18. A system comprising:

at least one processor; and one or more non-transitory computer readable storage media containing instructions executable by the at least one processor for causing the at least one processor to perform operations comprising:

receiving extracted data pertaining to a plurality of applications;

generating model-input data from the extracted data;

generating model-output data at least in part by processing the generated model-input data with a plurality of machine-learning models each independently trained to make one or more application-incident predictions, wherein the plurality of machine-learning models comprises a plurality of application-specific machine-learning models comprising:

a first machine-learning model that is trained using a training dataset specific to a first application and to a second application to make application-incident predictions with respect to h first application; and a second machine-learning model that is trained using the training dataset to make application-incident predictions with respect to h second application different from the first application;

making, based at least in part on the model-output data, an application-incident-likely determination that a likelihood of an occurrence of an application incident exceeds an application-incident-likelihood threshold, the application incident corresponding to the first application or to the second application; and responsive to making the application-incident-likely determination, outputting one or more alerts of the likelihood of the occurrence of the application incident.

19. The system of claim 18, wherein the application-incident-likely determination is that the likelihood of an occurrence of an application incident within a predetermined amount of time exceeds the application-incident-likelihood threshold.

20. One or more non-transitory computer readable storage media containing instructions executable by at least one processor for causing the at least one processor to perform operations comprising:

receiving extracted data pertaining to a plurality of applications;

generating model-input data from the extracted data;

generating model-output data at least in part by processing the generated model-input data with a plurality of machine-learning models each independently trained to make one or more application-incident predictions, wherein the plurality of machine-learning models comprises a plurality of application-specific machine-learning models comprising:

a first machine-learning model that is trained using a training dataset specific to a first application and to a second application to make application-incident predictions with respect to the first application; and a second machine-learning model that is trained using the training dataset to make application-incident predictions with respect to the second application different from the first application;

making, based at least in part on the model-output data, an application-incident-likely determination that a likelihood of an occurrence of an application incident exceeds an application-incident-likelihood threshold, the application incident corresponding to the first application or to the second application; and responsive to making the application-incident-likely determination, outputting one or more alerts of the likelihood of the occurrence of the application incident.

\* \* \* \* \*

UNITED STATES PATENT AND TRADEMARK OFFICE
CERTIFICATE OF CORRECTION

PATENT NO. : 12,067,502 B1
APPLICATION NO. : 18/154962
DATED : August 20, 2024
INVENTOR(S) : Stave et al.

Page 1 of 1

It is certified that error appears in the above-identified patent and that said Letters Patent is hereby corrected as shown below:

In the Claims

In Column 37, Line 25, in Claim 18, delete "h" and insert --the-- therefor

In Column 37, Line 28, in Claim 18, delete "h" and insert --the-- therefor

Signed and Sealed this
Twelfth Day of November, 2024

*Katherine Kelly Vidal*

Katherine Kelly Vidal
*Director of the United States Patent and Trademark Office*